(12) United States Patent
Noblet

(10) Patent No.: US 6,912,256 B1
(45) Date of Patent: Jun. 28, 2005

(54) OVER-THE-AIR RE-PROGRAMMING METHOD OF RADIO TRANSCEIVERS

(75) Inventor: Charles Marie Herve Noblet, Berkshire (GB)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/245,354

(22) Filed: Feb. 5, 1999

(30) Foreign Application Priority Data

Feb. 6, 1998 (GB) ............................................. 9802545

(51) Int. Cl.[7] .............................................. H04B 1/38
(52) U.S. Cl. ..................... 375/260; 455/419
(58) Field of Search ........................ 370/312, 328–329, 370/348–349, 486, 491, 389; 375/219, 220; 455/418, 419, 420, 67, 70, 88, 426, 432, 461, 422, 515, 520, 517, 434, 552

(56) References Cited

U.S. PATENT DOCUMENTS

| | | | | | |
|---|---|---|---|---|---|
| 5,012,234 A | * | 4/1991 | Dulaney et al. | ........... | 340/5.22 |
| 5,381,138 A | * | 1/1995 | Stair et al. | ................. | 340/7.41 |
| 5,586,122 A | * | 12/1996 | Suzuki et al. | ............... | 370/347 |
| 5,652,752 A | * | 7/1997 | Suzuki et al. | ............... | 370/330 |
| 5,745,677 A | * | 4/1998 | Grube et al. | ................. | 713/200 |
| 5,754,954 A | * | 5/1998 | Cannon et al. | ............. | 455/419 |
| 5,761,618 A | * | 6/1998 | Lynch et al. | ................. | 455/419 |
| 5,790,952 A | * | 8/1998 | Seazholtz et al. | ......... | 455/432.1 |
| 5,794,141 A | * | 8/1998 | Zicker | ......................... | 455/418 |
| 5,878,339 A | * | 3/1999 | Zicker et al. | ............... | 455/419 |
| 5,950,130 A | * | 9/1999 | Coursey | ...................... | 455/419 |
| 5,974,320 A | * | 10/1999 | Ward et al. | ................. | 455/432 |
| 5,995,829 A | * | 11/1999 | Broderick | ................... | 455/418 |
| 6,029,065 A | * | 2/2000 | Shah | ........................ | 455/414.4 |
| 6,044,265 A | * | 3/2000 | Roach, Jr. | ................... | 455/419 |
| 6,047,071 A | * | 4/2000 | Shah | ......................... | 380/273 |
| 6,128,483 A | * | 10/2000 | Doiron et al. | .............. | 455/419 |
| 6,195,546 B1 | * | 2/2001 | Leung et al. | ................ | 340/5.1 |
| 6,223,028 B1 | * | 4/2001 | Chang et al. | ............... | 455/419 |

* cited by examiner

Primary Examiner—Tesfaldet Bocure
Assistant Examiner—Khanh Tran
(74) Attorney, Agent, or Firm—Sughrue Mion, PLLC

(57) ABSTRACT

An over-the-air (OTA) re-programming method of a radio transceiver to make the transceiver compliant with arbitrary one of a plurality of networks. According to the method, a pilot channel for dedicated use and a bootstrap channel having a bandwidth enough to download the re-programming data are provided. The bandwidth of the pilot channel is narrower than the bandwidth of the bootstrap channel. First, at least frequency and radio access parameters of the bootstrap channel are broadcasted on the pilot channel and then the re-programming data to the radio transceiver is downloaded on the second channel based on the broadcasted parameters.

6 Claims, 3 Drawing Sheets

OVER-THE-AIR RE-PROGRAMMING METHOD OF RADIO TRANSCEIVERS

BACKGROUND OF THE INVENTION

1. Field of the Invention

The present invention relates to radio transmitter/receivers and in particular it relates to a method of re-programming radio transmitter/receivers over-the-air (OTA).

2. Description of the Prior Art

A radio transmitter/receiver (transceiver) such as a radiotelephone is designed for operation with particular types of networks such as GSM (global system for mobile communication) 900 or DCS (digital communication system) 1800. In GSM 900 and DCS 1800, radio waves of a 900 megahertz band and an 1.8 gigahertz band are used respectively. Each of GSM 900 and DCS 1800 is a mobile communication system widely used in, for example, Europe.

Intended use of the radiotelephone with a particular network(s) in a restricted geographical area, however, requires that the telephone be configured so as properly to communicate with the particular network(s). The user of a radiotelephone will usually have a telephone which has been configured for communication with a so called "home network". The home network is the local network usually most used by the subscriber.

The area within which a user of e.g. a GSM radiotelephone may operate, however, is considerable and is not limited to the home network but may be extended on many other networks throughout the world. Use of a handset outside the home network is known as "roaming".

When the radiotelephone is to be used in roaming it is often necessary for it to have a configuration different to that for use with the home network. It is possible for re-configuration of radio transmitter/receivers to be effected by means of signals received across the air interface.

It is also convenient for the radio to be re-configurable over the air interface so as to support different types of communication and user applications e.g. addition of address book manager, whether or not it is located in the home network.

Over-the-air re-programming of radio receivers is well known in the art and reference may be made to U.S. Pat. No. 5,381,138 for example. The capability to obtain programming data from a network is particularly useful for a roaming radio transmitter/receiver.

When beginning operation in an area for which the radiotelephone is not configured and it is required to download the data for reconfiguration from one of the available networks, a communication link must first be established with the network of interest. It has been proposed that a pilot channel be established in all areas from which the roaming radiotelephone may obtain the data necessary for reconfiguration.

A pilot channel of this type, however, will require a relatively large bandwidth to allow a sufficiently fast transfer of the data required. Since the pilot channel is provided separately from a traffic channel used for transferring voice data and a control channel for performing control operations inherent to the particular network, establishment of the pilot channel of a relatively large bandwidth lowers utility efficiency of the frequency resources in the whole network. Further, the task of standardization of the pilot channel of a relative large bandwidth for transferring a large amount of data is considered to be complicated.

SUMMARY OF THE INVENTION

The object of the present invention is to provide an over-the-air re-programming method of a radio transceiver which does not deteriorate the utility efficiency of the frequency resources of a network and can be easily standardized.

According to the invention there is provided a method of downloading re-programming data from a network for installation in a radio transmitter/receiver comprising initial communication from a first dedicated channel of relatively small bandwidth broadcasting at least the frequency and radio access parameters of a second channel of re large bandwidth from which re-programming. data may be downloaded.

The above and other objects, features, and advantages of the present invention will become apparent from the following description referring to the accompanying drawings which illustrate examples of preferred embodiments of the present invention.

DESCRIPTION OF THE PREFERRED EMBODIMENTS

A roaming radio transmitter/receiver (mobile) is located in a region served by one or more networks and the user of the mobile wishes to communicate with a network from which the user can obtain re-programming data and subsequently begin communicating with the network in the communication mode selected.

A pilot channel broadcast is maintained in the region and contained in the pilot channel broadcast there is at least sufficient information for the mobile to connect to a second channel which will be called the bootstrap channel. Conveniently the pilot channel will be broadcast in all over a standardized radio interface. Only a small bandwidth is required for the pilot channel because of the small amount of information contained in the broadcast.

The small bandwidth requirement makes the task of standardization much easier with respect to the pilot channel. The wider bandwidth channels are more conveniently assigned locally for ease of implementation.

The pilot channel (P_CH) broadcasts a list of sets of parameters corresponding to networks available in the region. The mobile receives the network transmission through the pilot channel. If the existing configuration of the mobile is matched to the available regional radio schemes, then a second channel, that is, the bootstrap channel (B_CH), is logically mapped onto the selected transmission mode. The base station and mobile exchange information over this dedicated logical channel.

The bootstrap channel is logically mapped on top of one of the default modes of the terminal; a mapping of a logical bootstrap channel onto the physical GSM channel for instance may be implemented. Once the mapping has been effected the terminal may download data from the base station. The bootstrap channels provided by each operator may accommodate differing services with regard to the applications available for downloading.

Figure 1:
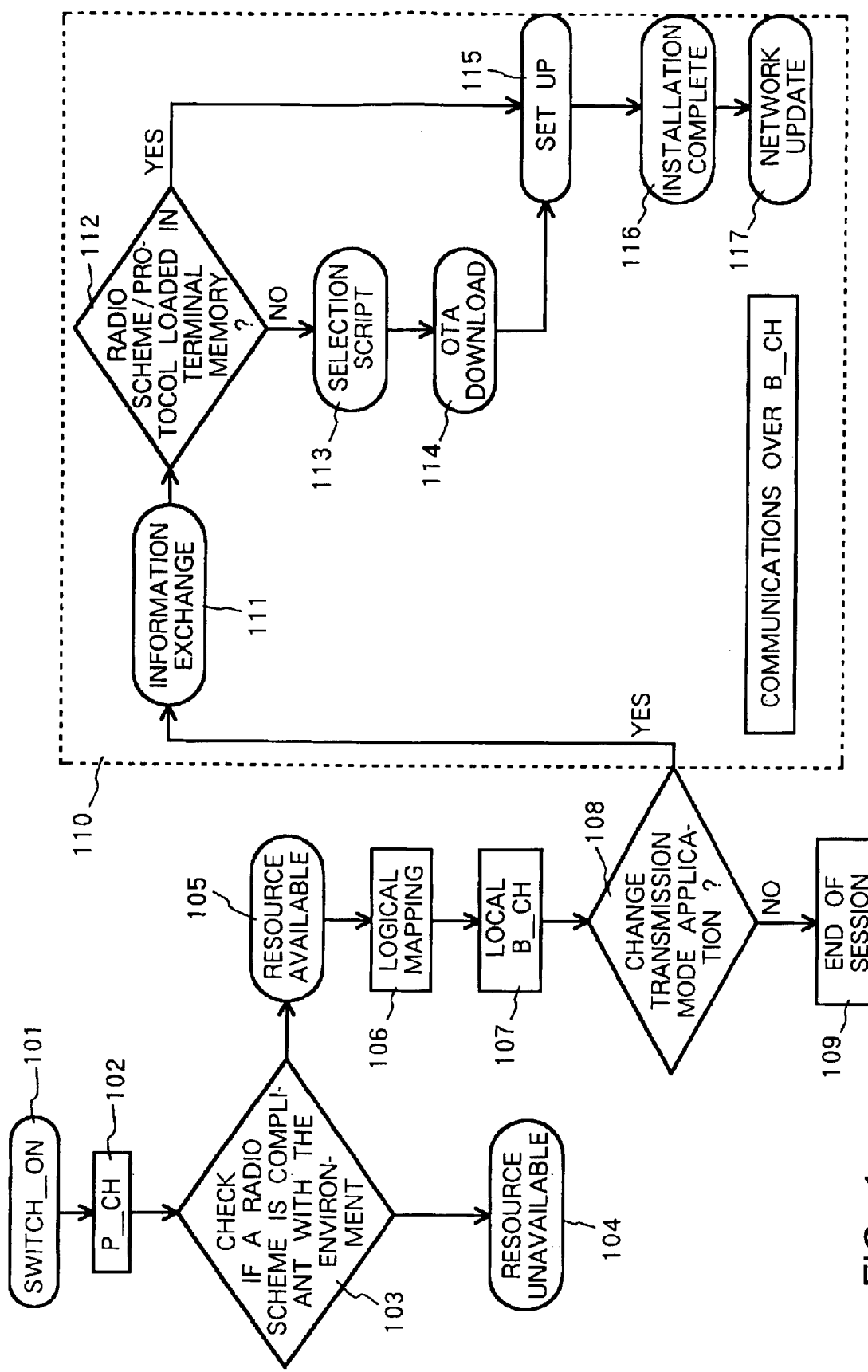
FIG. 1 is a flow diagram of a reconfiguration process in a preferred embodiment according to the present invention.

The flow diagram shown in FIG. 1 depicts a reconfiguration procedure.

When the mobile is switched on in step 101, it reads the pilot channel broadcast at step 102. The mobile must be configured to support the (standardized) radio interface of the pilot channel. The pilot channel carries local radio parameters (standards supported in the regional environment in which the mobile is located).

After processing the received information, it is checked whether the radio scheme of the mobile is compliant with the environment or not at step 103. If the minimum resources required by its radio local environment are not available, then the processing is terminated at step 104. If the mobile has the minimum resources required by its local radio environment at step 105 the mobile communicates with the base station through the bootstrap channel. Prior to the change of channel, pilot channel (P_CH) to bootstrap channel (B_CH), a logical mapping of the bootstrap channel is performed within the mobile on the selected air interface at step 106.

When operation on a local bootstrap channel transmission has been established, the user may wish to change some properties or the performance of his mobile and can request supply of the desired services from the network. Here, it is determined whether the transmission mode application is to be changed or not at step 108. If no changes are required then the mobile adopts the default transmission mode in stand-by and releases the allocated bootstrap channel and the session ends at step 109.

If the user requests a change at step 108 then communication shown in box 110 between the base station and mobile is maintained for the information exchange in step 111, the nature of which will depend on the capabilities of both mobile and network. At least three conditions can affect the nature of this information exchange.

Firstly, the mobile may not be able to support the required software. Where the mobile is not able to support the required software, no communication channel is available to the mobile from the existing network resources and use of the mobile within the region will therefore not be possible.

Secondly, the required software may be stored already in the mobile's memory. In this situation there is no need to download a software module but the allocated bootstrap channel connection is maintained for further operations as described.

Thirdly, the software module required to support a different type of communication or user application may need to be downloaded from the base station. Where the download of a software module is required, initially a selection script is downloaded to the mobile followed by downloading and installation of the required software.

In step 112 shown in FIG. 1, it is checked whether radio scheme/protocol is loaded in the memory of the mobile (i.e., terminal) or not, thereby discriminating the above second case from the third case. When the download of the required software into the mobile has been completed the processing goes to step 115. If the download of the required software has not been completed at step 112, the selection script is downloaded at step 113 as described above and the required software is downloaded over-the-air and installed at step 114. Then, the mobile is set up at step 115.

After the completion of installation of the required software to the mobile at step 116, the mobile signals to the network the achievement of correct reconfiguration. On receipt of the "correct reconfiguration" signal from the mobile details of the mobile identity and its present configuration are entered on the network database (to license the product for instance). Then the network database is updated at step 117.

Figure 2:
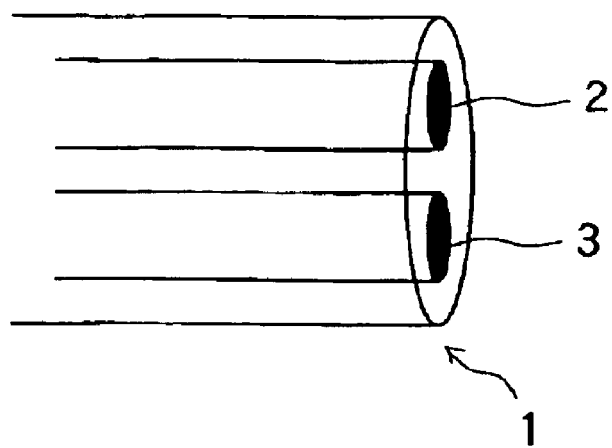
FIG. 2 illustrates a logical structure of a bootstrap channel.

With reference to FIG. 2, the logical structure of the bootstrap channel 1 will include two logical sub-channels: a download channel 2 and a signaling control channel (S_CH) 3. The signaling control channel 3 assists in the reduction of errors in transmission so as to allow correct software download.

In the above example, the first channel, the pilot channel, is standardized and the mobile must be configured to support the radio interface for the pilot channel. The second (bootstrap) channel may be subject to local definition through logical mapping on a local transmission mode e.g. GSM, DECT (digital European cordless telephone) and the mobile is not initially configured to support the radio interface for the bootstrap channel.

An example of a method of re-programming providing greater flexibility will now be given. This example is modification of the example shown in FIG. 1. In this example the mobile is configured to support the radio interfaces for both the first, dedicated relatively small bandwidth (pilot) channel and the second relatively large bandwidth (bootstrap) channel. That is to say that when the mobile is switched on in most and preferably all regions, the network can communicate with the mobile via both pilot and bootstrap channels.

In order for the mobile always to have the appropriate radio interface for the bootstrap channel then this channel would need also to be standardized (in addition to the pilot channel). The parameters of the bootstrap channels provided in different regions may have local variations in terms of e.g. allocated frequency, data rate and available user applications.

Figure 3:
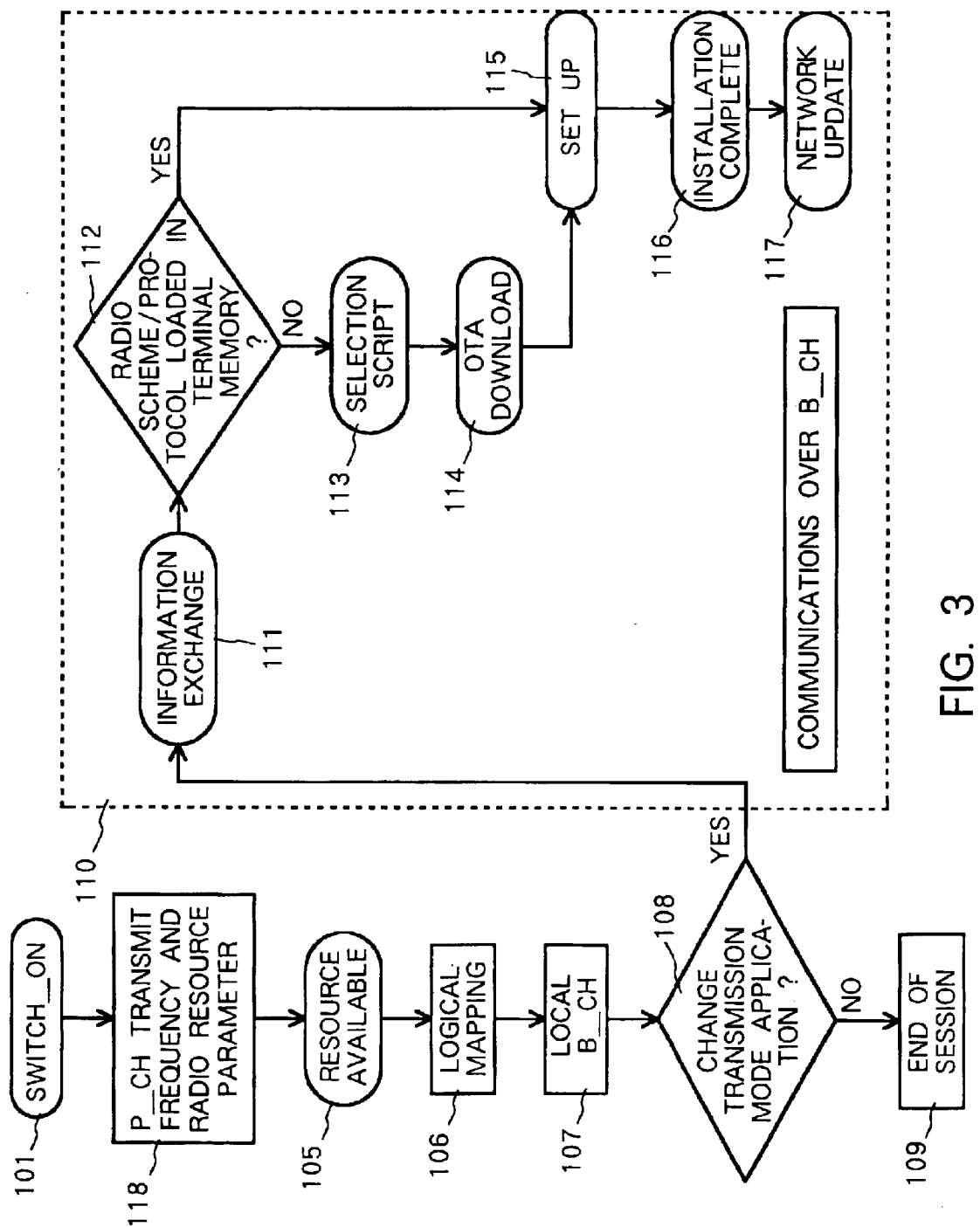
FIG. 3 is a flow diagram of an alternative reconfiguration process according to the present invention.

With reference to FIG. 3 which is a flow diagram of the reconfiguration process for this example, the mobile when switched on at step 101 reads the pilot channel broadcast. The allocated frequency and radio resource parameters for the bootstrap channel contained in the pilot channel broadcast are processed at step 118 and any required logical mapping effected at step 106. After processing the received information, the moble communicates with the base station through the bootstrap channel in box 110.

The condition likely to be experienced in the previous example whereby the mobile is not able to support the required software and no communication channel is available to the mobile from the existing network resources does not apply in this arrangement. The communication via the bootstrap channel allows the request for and supply of the software module necessary to establish communication with the network. The transfer to the bootstrap channel does not depend on the existing configuration of the mobile since the bootstrap channel is standardized in this example and the mobile is equipped to interface, via the pilot channel, with the bootstrap channel.

The services and structure offered by the bootstrap channel are common for both of the above examples, however, the requirements on the terminals and networks differ.

The bootstrap channel will provide the following services by means of over-the-air (OTA) reconfiguration:

(1) capability exchange: the terminal provides some information to the network on its current configuration and capabilities.

(2) module selection: at this stage the user specifies the software that his terminal requires to download. This operation could be compared to an installation script.

(3) data download transfer of the data. In some cases software code will have to be downloaded whilst in other cases the software may already be implemented in the mobile. In the latter case, a set-up mechanism would be sufficient to initiate the reconfiguration.

Once the mobile and the base station are synchronized on the bootstrap channel, information exchange can begin.

It is to be understood that variations and modifications of the over-the-air re-programming method disclosed herein will be evident to those skilled in the art. It is intended that all such modifications and variations be included within the scope of the appended claims.

What is claimed is:

1. A method of downloading re-programing data from a network for installation in a radio transmitter/receiver comprising:

receiving communication from a first dedicated channel; and broadcasting, on the first dedicated channel, at least the frequency and radio access parameters of a second channel from which re-programming data is downloaded, wherein the radio access parameters comprise parameters indicative of communication standards supported by the network, wherein a bandwidth of the first dedicated channel is narrower than the bandwidth of the second channel, wherein the first dedicated channel is a pilot channel that is a channel separate from a traffic channel and a control channel, and wherein the second channel is a bootstrap channel comprising:

a first subchannel; and a second sub-channel, wherein the re-programming data is downloaded via the first sub-channel, and a signal control for error reduction during communication is performed via the second sub-channel.

2. A method for downloading re-programming data over-the-air from a network for installation in a radio transmitter/receiver, comprising:

providing a first channel for dedicated use and a second channel to download the re-programming data, a bandwidth of the first channel being narrower than the bandwidth of the second channel;

broadcasting on the first channel, at least frequency and radio access parameters of the second channel, wherein the radio access parameters comprise parameters indicative of communication standards supported by the network; and downloading the re-programming data to the radio transmitter/receiver on the second channel based on the broadcasted parameters, wherein the first channel is a pilot channel that is a channel separate from a traffic channel and a control channel, and wherein the second channel is a bootstrap channel comprising:

a first sub-channel; and a second sub-channel, wherein the re-programming data is downloaded via the first sub-channel, and a signal control for error reduction during communication is performed via the second sub-channel.

3. A method of downloading re-programming data from a network for installation in a radio transmitter/receiver comprising:

receiving communication from a first dedicated channel;

broadcasting, on the first dedicated channel, at least the frequency and radio access parameters of a second channel from which re-programming data is downloaded, wherein the radio access parameters comprise parameters indicative of communication standards supported by the network, wherein a bandwidth of the first dedicated channel is narrower than the bandwidth of the second channel, and wherein the first dedicated channel is a pilot channel that is a channel separate from a traffic channel and a control channel;

the method further comprising:

checking if a programming of the radio transmitter/receiver is compliant with the parameters indicative of the communication standards supported by the network;

if the programming of the radio transmitter/receiver is not compliant with the parameters indicative of the communication standards supported by the network, terminating processing of the radio transmitter/receiver; and if the programming of the radio transmitter/receiver is compliant with the parameters indicative of the communication standards supported by the network, establishing communication between the radio transmitter/receiver and the network on the second channel.

4. The method according to claim 3, comprising if the programming of the radio transmitter/receiver is compliant with the parameters indicative of the communication standards supported by the network, determining if a communication change has been requested;

if the communication change has not been requested, releasing communication on the second channel; and if the communication change has been requested, performing the requested communication change.

5. The method according to claim 4, wherein the performing of the requested communication change comprises:

maintaining communication between the radio transmitter/receiver and the network on the second channel;

determining if the radio transmitter/receiver is configured to support the requested communication change;

if the radio transmitter/receiver is not configured to support the requested communication change, reconfiguring the radio transmitter/receiver to support the requested communication change; and downloading to the transmitter/receiver, on the second channel, the re-programming data for performing the requested communication change.

6. The method according to claim 5 wherein the reconfiguring of the radio transmitter/receiver comprises downloading to the radio transmitter/receiver, on the second channel, a scheme/protocol required to support the requested communication change.

* * * * *

UNITED STATES PATENT AND TRADEMARK OFFICE
CERTIFICATE OF CORRECTION

PATENT NO. : 6,912,256 B1 Page 1 of 1
APPLICATION NO. : 09/245354
DATED : June 28, 2005
INVENTOR(S) : Charles Marie Herve Noblet It is certified that error appears in the above-identified patent and that said Letters Patent is hereby corrected as shown below:

Priority Data after "9802545", insert -- .5 --.

Signed and Sealed this

Twenty-second Day of August, 2006

JON W. DUDAS
*Director of the United States Patent and Trademark Office*